H. E. HAWES.
FLYING MACHINE.
APPLICATION FILED SEPT. 9, 1909.

1,067,425.

Patented July 15, 1913.

WITNESSES:

INVENTOR.
Herbert E Hawes

H. E. HAWES.
FLYING MACHINE.
APPLICATION FILED SEPT. 9, 1909.

1,067,425.

Patented July 15, 1913.

WITNESSES:
A. F. Downs
W. E. Mountfort.

INVENTOR.
Herbert E. Hawes

H. E. HAWES.
FLYING MACHINE.
APPLICATION FILED SEPT. 9, 1909.

1,067,425.

Patented July 15, 1913.

WITNESSES:
A. F. Downs
L. C. Moulton

INVENTOR.
Herbert E. Hawes

H. E. HAWES.
FLYING MACHINE.
APPLICATION FILED SEPT. 9, 1909.

1,067,425.

Patented July 15, 1913.
6 SHEETS—SHEET 4.

WITNESSES:

INVENTOR.

H. E. HAWES.
FLYING MACHINE.
APPLICATION FILED SEPT. 9, 1909.

1,067,425.

Patented July 15, 1913.

WITNESSES.
A. F. Downs
L. C. Moulton

INVENTOR.
Herbert E. Hawes

H. E. HAWES.
FLYING MACHINE.
APPLICATION FILED SEPT. 9, 1909.

1,067,425.

Patented July 15, 1913.

WITNESSES:
A. F. Downe
C. C. Moulton

INVENTOR.
Herbert E. Hawes

UNITED STATES PATENT OFFICE.

HERBERT E. HAWES, OF NEW YORK, N. Y.

FLYING-MACHINE.

1,067,425.  Specification of Letters Patent.  Patented July 15, 1913.

Application filed September 9, 1909. Serial No. 516,968.

*To all whom it may concern:*

Be it known that I, HERBERT E. HAWES, a citizen of the United States, and residing in the borough of Brooklyn, county of Kings, city and State of New York, have invented certain new and useful Improvements in Flying-Machines, of which the following is a specification.

This invention relates to flying-machines and has particular application to a machine of the type known as an aeroplane.

In carrying out my invention it is my purpose to provide a machine having an improved form of supporting surfaces, embodying the desired features of simplicity and efficiency.

A further object of my invention is to provide an automatic balancing device for the machine.

A further object of my invention is to provide a brake or check adapted to arrest the forward movement of the machine at desired times.

Further my improved machine embodies an improved method of staying or bracing the main frame, and means for enabling the machine to be used either on land or water.

My invention consists in the construction, combination and arrangement of parts set forth in and falling within the scope of the appended claims. In the present instance I have omitted showing the motor accessories, as the art therein is too well known to need description, and furthermore any suitable motor may be used of the requisite weight and power. The propellers shown herein, also the landing mechanism, and gyroscope mechanism, being matter under a different class, will be made subjects of applications separate herefrom.

Figure 2:
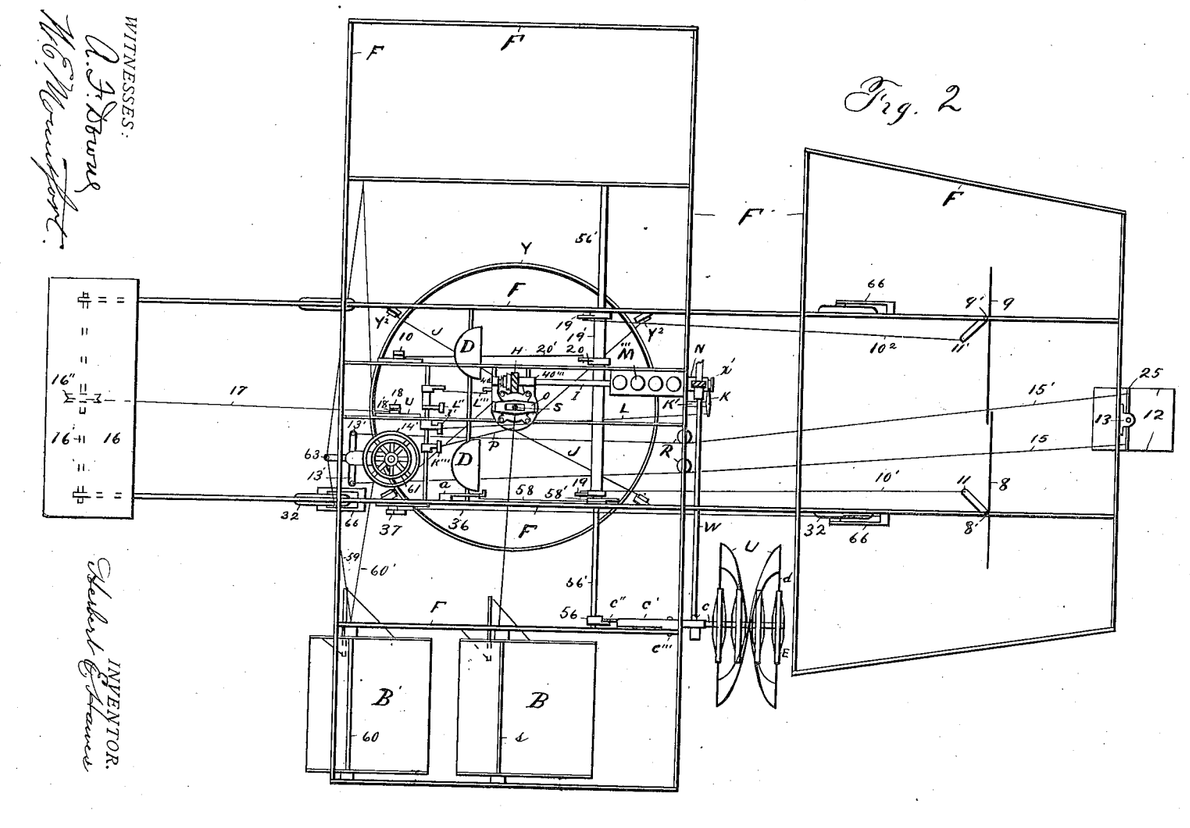
Fig. 2 is a plan view, with the supporting planes removed and in which I have detailed only one side, where there are two similar parts on opposite sides, and shown the gyroscope rim in outline, omitting the spokes.
Figures 3, 15:
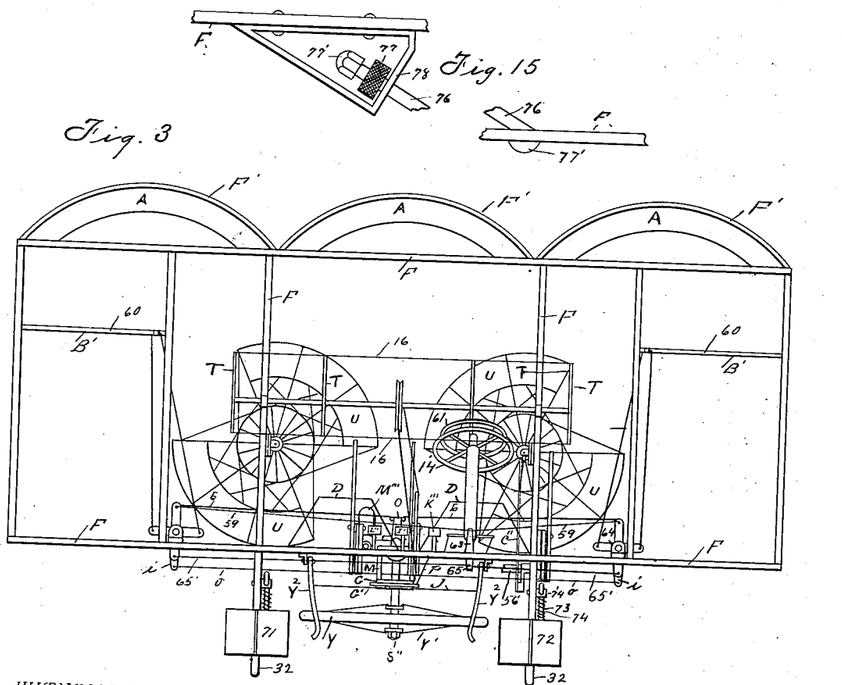
Fig. 3, is a front elevation with the same side detailed as Fig. 2.
Fig. 15 is a view of yielding guy-wire, fastenings, or anchorage.
Figure 4:
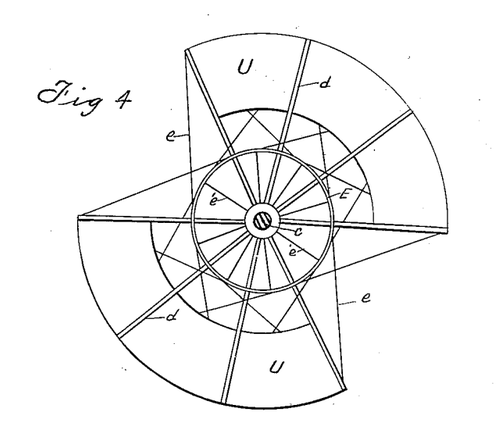
Figs. 4—5 show side and end elevation of propellers.
Figure 5:
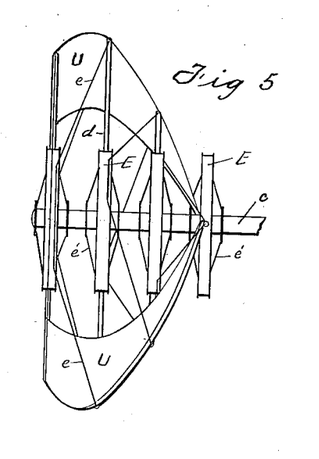

In the accompanying drawings like reference characters indicate like parts in the various views, the drawings not being made to scale, certain parts are exaggerated in size for clearness in illustration.

Where there are identical parts in the opposite sides of the machine I have detailed only one side, the propellers for example in Figures 2 and 3.

Figure 1:
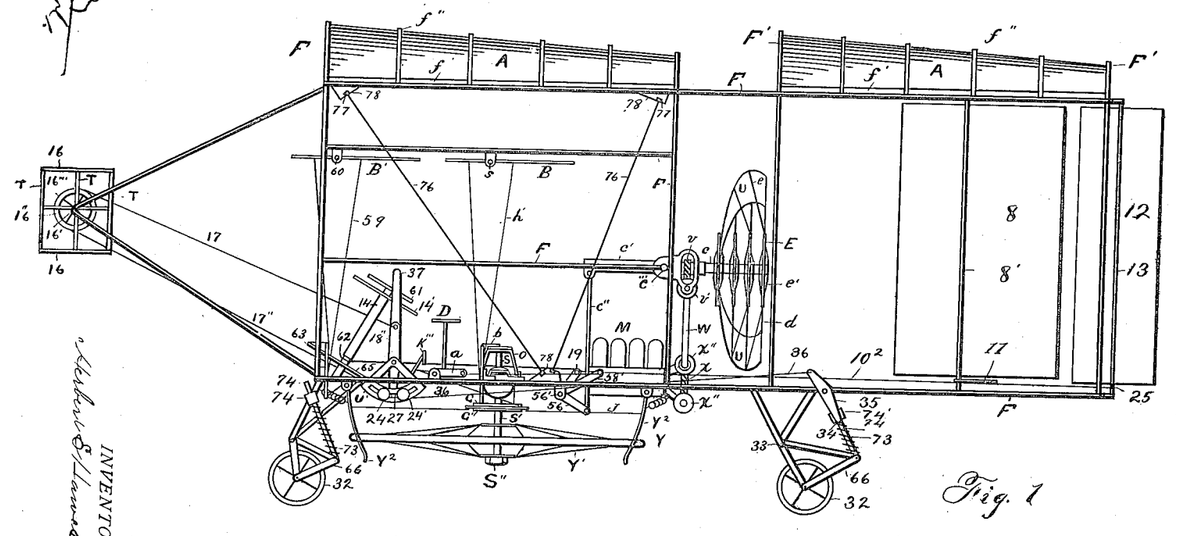
—Fig. 1 is a general side elevation of my machine.

For clearness in illustration, I have shown the check planes in their normal or inoperative positions in Fig. 1. In Fig. 2, they are shown in the operative position, or crosswise of line of motion.

D represents the operator's seats, M''' the motor.

In carrying my invention into practice, I construct a frame of strips F of wood or of any desired material having the necessary strength and lightness, and fasten the "aerofoil" A, on minor secondary frames, of curved cross section, these in turn, I fasten to top of frame F, as shown in Figs. 1—2—3. These supporting surfaces I prefer to make in separate parts, in this instance four, although I might make them the entire length of the main frame, and use one or two sections only, the number being optional. By making them somewhat larger in front and with depressed sides, the air entering them, on the forward movement of the machine, is forced toward the center, and consequently forces the contained air downward; and, reacting in the opposite direction, produces an increased lifting effect on the supporting surfaces, more so than if it were acting on planes with straight or undepressed sides or edges. In constructing these supporting units, I use a hoop or band F' at the large and small end thereof, to give them the desired shape and fasten the "aerofoil", which may be of any suitable material, to the inside, so as to offer a smooth surface to air resistance.

In Fig. 2 only the rear plane is shown in outline, the three forward planes being shown in elevation in Fig. 1, and they are of the same shape as shown in Fig. 2. Along the sides of these minor frames, I affix light strips, of wood preferably, $f'$ to fasten the aerofoil to, and in turn fasten these to the top of frame F, although, in many cases, the aerofoil might be fastened to the frame F direct, without departing from my invention. To help preserve the curved cross-section shape, I also mount between the end frames smaller and lighter reinforcing strips $f''$, which may be placed either in the same direction as strips F' as shown, and fastened to the side strips $f'$, or lengthwise of planes, and fastened to members F'. In practice, I prefer to mount strips $f''$ longitudinally of machine, and fasten same to strips F'. In either case, the supporting surface fabric or aerofoil A is fastened to the inside.

It will be understood that it is optional to use a single supporting surface, of my improved shape, extending the full length of the machine, or a plurality of smaller sized planes, with the same aggregate amount of supporting surfaces. These planes might be made also, without the narrowed or contracted rear end, using the depressed sides, without departing from my invention.

Figure 12:
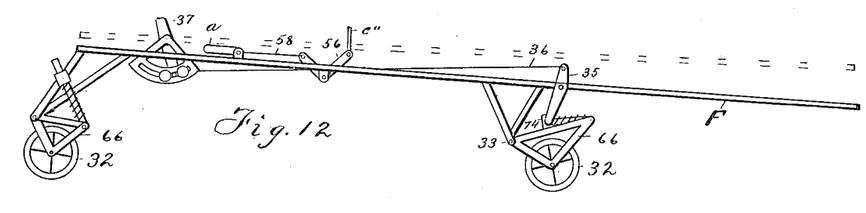
Fig. 12 shows details of plane supporting wheels, and mechanism for dropping rear of frame.

For propelling the machine forward, I use two propellers rotating in opposite directions, disconnectible from the motor by a friction clutch, and located preferably, on opposite sides of the frame, behind the wings of same, see Fig. 2. These propellers are mounted on the ends of shafts $c$, which revolve in bearings in movable sleeves $c'$ pivoted at $c'''$, transversely of the machine, for the purpose of giving the propellers an upward inclination, to exert a lifting, as well as propelling action at certain times, as in rising from the ground. Their shafts $c$ are inclined or adjusted by movement of the hand lever $a$, which is disposed and proportioned, so as to give them any desired inclination deemed desirable, lever $a$ being pivoted to the frame F at one end as shown in Figs. 2 and 12. In this instance, only a few degrees of elevation are provided for by proportions and throw of lever $a$; although said lever might be made to give the propellers a nearly or quite perpendicular lifting action, by increasing its scope of action. This description applies to both propellers, although it might be used in case of only one propeller, placed in the center of machine.

From sleeve C' extends downwardly, a rod $c''$, pivoted thereto at its free end, and to rock lever 56 on shaft 56', which extends crosswise of the machine, and has rigidly fastened to its opposite end a similar lever connected with the movable shaft bearing $c'$ on opposite side of machine, for giving synchronous elevating movement to the opposite propeller. Said similar lever being a duplicate, is not shown in the drawings on opposite side.

By throwing over lever $a$, from its normal or rear position, as shown in Fig. 1, to its extreme or forward position, shown in Fig. 12, shaft 56' is rocked, causing simultaneous upward inclination of propeller shafts $c$, through their respective connections $c''$.

The blades U of the propellers extend in a helix about the central shaft $c$. To enable the use of blades of very light material, I erect on shaft $c$ radial arms $d$, on lines corresponding to the helical pitch of the propellers, and fasten blades U to their outer ends, arms $d$ serving as ribs to preserve their shape. This construction enables me to use very thin sheet metal, or even fabric, without the tendency of the blades to buckle or warp out of shape, as the radial arms, extending across blades U, stay them and tend to keep them in shape while in action. I prefer to use only the outer portion of arms $d$, for support of blades U, making said blades relatively longer and narrower, thereby preserving the same amount of surface. If they extend to the center or to shaft $c$, the inner portion assumes a more obtuse angle to the plane of rotation, and offers more resistance, and is not presented at a favorable angle for propulsion. To brace arms $d$, I stay them by wires or guys $e$, running over circular rims E, mounted concentrically on shaft $c$, held and braced by spokes $e'$ like a bicycle wheel rim said arms resting in central radial apertures formed in rims E. The spokes are provided with threaded ends and nipples for adjustment in the well known manner. These guys extend in opposite directions and rearwardly from blade U, over rims E, and fasten rigidly to the outer end of an opposite arm $d$, being rigidly fastened also to rim E where they rest on its circumference, in any suitable manner, and are provided with means for adjusting their tension in any suitable way. For turning these propellers I connect them with the motor in the following manner: On shaft $c$ I rigidly mount helical gear $v$, and, on transverse shaft W running in bearings W' extending from sleeve $c'$, a mate gear $v'$. On the motor shaft, I mount slidably, a member X' forming one part of a friction clutch, the other member, gear X, being revolubly mounted on same. Member X' contains a circular groove in which acts yoke lever K, pivotally mounted on a support K'. From opposite end of yoke lever K, a connection L leads to lever I', pressure on which, separates members X—X' stopping the propellers. While running, the friction clutch members are held together by spiral spring L'. In bearings N extending from the motor base, are mounted short transverse shafts N', on which are mounted helical gears X", connecting with the propellers through inclined transverse shafts W; these are provided with universal and slip joints between gears X"—v', to prevent binding same, by twisting of frame. The teeth of the helical gears X—X"—v—v' are so cut and arranged that the shafts c are rotated in opposite directions. These propellers may be driven by belts, flexible shafts, or chains if preferred, and any form of clutch or mechanism between them and the motor may be used, so that they are started gradually and uniformly. One propeller only is shown in Figs. 1 and 2. It will be understood that a duplicate propeller is used on the opposite side. The blades U are preferably made of thin metal, and are fastened to arms d by rivets, clamps, or any suitable way. Members c, d, e and the other coöperative parts, are preferably of steel, c' of aluminum.

Figure 13:
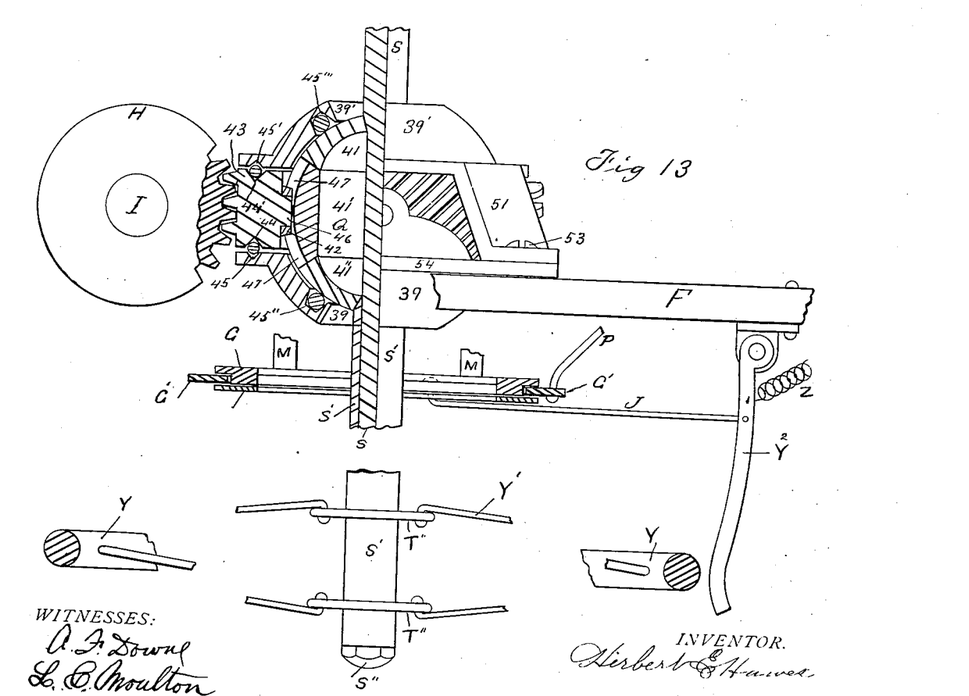
Fig. 13 is a side elevation, partly in section and partly broken away, showing details of gyroscope sleeve, rim, brake arms, brake actuating mechanism, universal joint, and sleeve locking nut.
Figure 14:
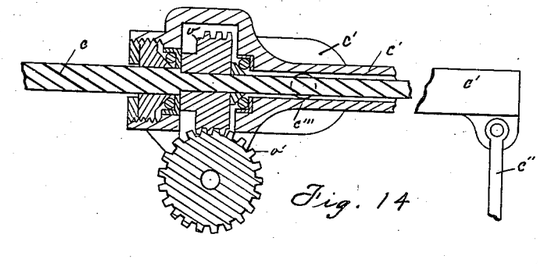
Fig. 14 shows side elevations of propeller sleeve bearings, partly in section.

To automatically balance my machine against sidewise roll or tip, I employ two automatically moved balancing planes, B—B mounted on transverse horizontal shafts s pivoted to the machine frame, at the extreme right and left of the frame wings, see Figs. 2—3. For moving these planes automatically, I employ the tipping motion of the machine itself, using as a fulcrum or working point, the shaft S of a well known, although not extensively used device, called a gyroscope; whose peculiar property or function, of always maintaining its original plane of rotation irrespective of the movement of its support, I make use of as follows: The gyroscope consists of a relatively heavy metal rim Y, of large diameter, mounted on a vertical sleeve S', provided with a universal joint or bearing, said rim being hung below the machine frame centrally, and under the main supporting surface. Said rim is held to shaft S and sleeve S', by staggered offset spokes Y', like a bicycle wheel rim, engaging flanges T" on sleeve S'. The spokes are provided with threaded nipples to adjust the tension thereof in the well known manner. Shaft S extends from ball Q, downward through sleeve S', being provided with a threaded end and nut S", by which ball Q, shaft S, and sleeve S', are locked together. The gyroscope universal joint is shown partly in section, to illustrate more clearly its construction—through line A—A Fig. 9—see Fig. 13. The body is composed of two parts 39—39', member 39 having extension lugs 40—40''', for the motor shaft bearings. The shaft ball Q, is composed of three sections 41—41'—41" which are provided with taper seats and held together as one, by shaft S, which is made in two sections, one a sleeve S', which is the gyroscope wheel hub, and the other extending from the top of frame O, downward through ball Q, and hub of gyroscope and tightened with a nut S" below. The part of shaft S above Q, is enlarged and cone-shouldered where it engages the upper side 41 of ball Q; the smaller part extending through Q and said sleeve S', and threaded at its lower end to receive nut S" whereby the three sections of ball Q are clamped and held together. The central section 41' of ball Q is ring shaped, and provided with a conical seat on each side, for the reception of the sections 41—41". It is further provided with two diametrically opposite V shaped slots 47—47'—47' not shown—in its periphery, for the reception of the driving rollers 42—42'. Surrounding ring 41' is the annular helical gear 43 running on ball bearings, in races 45—45' in the body 39—39', and corresponding races 44—44' formed in its upper and lower sides. On the interior of gear 43 are formed two studs 46—46', 46' not shown, carrying conical rollers 42—42', 42' not shown, which engage in corresponding V-shaped slots 47—47', 47' not shown, in ball member 41', said studs being disposed diametrically opposite each other, and in the same plane with center of ball Q, which is free to swing in any direction, within the limit of the clearance spaces provided in slots 47—47', 47' not shown,—and the openings in body 39—39' at top and bottom of same, provided for shaft S. The body is composed of two cup shaped members 39—39' spaced apart by legs 49—50—51—52, for the reception of gear 43, and provided with ball races, 45"—45''', the balls in which bear on members 41—41". The body members are held together by screws through the legs, the complete fixture being bolted to frame F, through flanges 54—55 on opposite sides thereof. Meshing with gear 43 is helical gear H, on motor shaft I, running in bearings 40—40''' extending from joint body-member 39.

Figure 8:
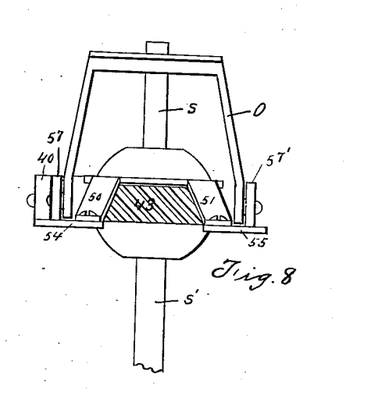
Fig. 8 shows side elevation of gyroscope shaft.

It will be understood that the gyroscope wheel Y might be mounted in other positions relative to the frame of the machine, and on other than universal bearings; also that it might be held from swaying without stopping its rotation, and that it might be disconnected from its actuating power source at other places than the motor shaft I; as, for instance, it might be provided with a friction device in its hub, and disconnected thereat, or it might be provided with a friction device at ball Q for disconnection and control. To allow for longitudinal or pitching movements of the machine, without binding shaft S, I form frame O with a slot O' to allow free movement of shaft S fore and aft, without moving frame O. Frame O is pivoted longitudinally of frame, on ears 57—57', projecting upwardly from body 39, see Figs. 8—9. Shaft S is provided with a slide or wearing block where it works in slot O' in frame O.

Figure 9:
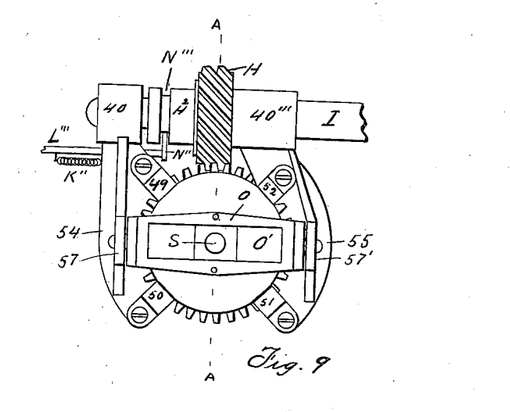
Fig. 9 is a plan view of same, and friction clutch.

To impart rotary motion to rim Y of the gyroscope wheel, said rim being held and connected to shaft S by wire spokes Y' like a bicycle wheel rim, I employ gear H, see Fig. 9, which also serves as the female member of a friction clutch; the male member H², being slidably mounted and feathered on shaft I, and normally held into engagement with H by spring K''; disconnection being made by pressure on foot treadle L'', through connecting wire L''' and yoke N''', acting in groove N''' in sleeve H², to separate the clutch members.

To avoid undue swing of the gyroscope wheel, and to stop said wheel more quickly, I provide a friction brake consisting of four pivoted arms Y², to engage the outside of rim Y; said arms being pivoted horizontally at their upper ends on bearings on the machine frame, their lower or free ends being movable, radially, relatively to rim Y. This friction device also serves the double purpose of initially holding the gyroscope in proper relation to the machine for starting same, and to prevent it from swaying dangerously in landing, which might derange its driving mechanism, or cause damage to adjacent parts of the machine. These friction arms are actuated from lever K''' by connections J leading to a central ring G', inclosing shaft S, and held in position on a bearing G fastened to the machine frame.

By reason of tangential connections, a circular movement of ring G', causes a pull upon wires J and a simultaneous inward movement of arms Y² causing them to frictionally engage the outside rim Y, thereby stopping same; and by continued pressure upon lever K''', to retain ring Y against sidewise displacement, until release of pressure of arms Y², by return of lever K''' to its original position; the friction arms being held normally away from ring Y by spiral springs Z. Bearing G is provided with a circular shouldered seat, for reception of actuating ring G', see Fig. 13, and is located concentric with shaft S, and held to frame of machine by posts M. Actuating ring G' is given its circular arm tightening motion from lever K''' by connecting wire P.

The operation of the balancing wheel Y and planes B is as follows: On the lateral tipping of the machine to the left, the left hand plane is given a positive or lifting inclination to right the machine, through the connecting wire b, connecting with the upper arm G'' of rocklever G''', through the inner arm h and connection h', connected to the rear of pivoted balancing plane B, giving it its upward inclination, by reason of the lengthened distance obtaining through the frame O oscillating to the right, by reason of shaft S remaining in its original or normally upright position, owing to the peculiar property or function of the gyroscope wheel Y maintaining its horizontal plane of rotation, causing frame O to oscillate on its pivots, thereby causing a pull on tension connection b fastened to its upper or movable end to positively incline left hand plane B.

Figures 10, 11, 16, 19:
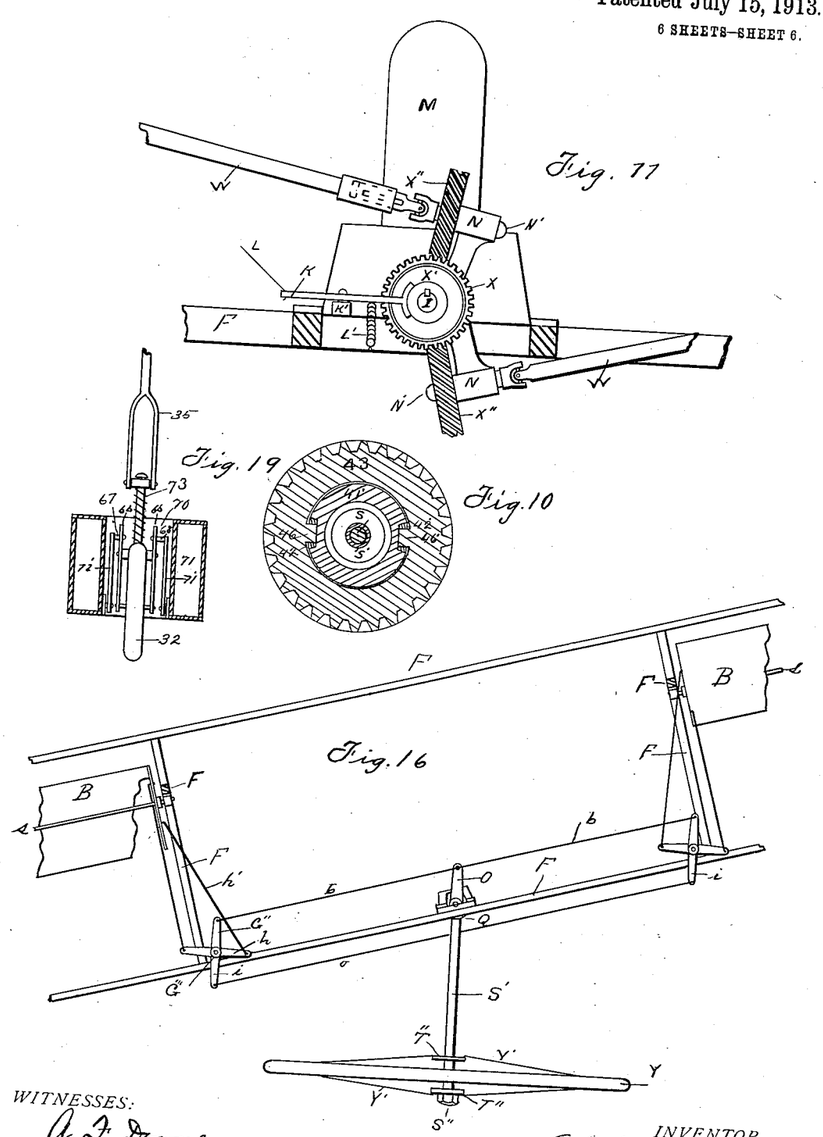
Fig. 10 is a horizontal section through center of the gyroscope universal joint.
Fig. 11 shows propeller actuating mechanism, and friction clutch details.
Fig. 16 is a plot of the movement of planes B—B and the coöperating parts and connections.
Figs. 17—18—19 are views of the pontoons in combination with the wheel frames for marine work.

From the lower arm i of left hand rocklever G''', extends a connection o, to the lower right hand arm i, on opposite side of machine, by which a negative inclination is given the right hand plane B, which tends to depress the right of the machine simultaneously; see Fig. 16 which gives a plot of said motions. A tipping motion to the right causes a reverse movement of the respective parts, and a positive inclination of right hand plane B, and negative inclination to left.

The gyroscope may be actuated by belts or chains, instead of gears, if so desired, or any other way at option.

The gyroscope rim is made of metal, preferably, as are the other parts of same. The ball Q, and its coöperating parts, are of steel preferably, and hardened.

For balancing my plane laterally, while the gyroscope is thrown out of action, I use two hand actuated auxiliary planes B'—B' located at the extreme right and left of the machine; said planes being mounted on transversely pivoted horizontal shafts 60, and actuated from hand wheel 61 on steering post 62 through connections 59, so connected, that a movement of the rear of said wheel 61 to the left gives an upward inclination of the left hand plane B', and a simultaneous downward inclination of the right hand plane; an opposite movement of wheel 61 producing opposite results. The connecting wires 59, are led from arm 63 on post 62, to rocklevers 64; which serve only to change the direction of motion, in the connections, from post 62 to planes B' B'. The rocklevers 64—it will be observed—are provided with an arm above and below their pivots; the lower one being connected to the arm 65 on rear of post 62, by connections 65', insures a simultaneous opposite motion to the respective planes, on movement of wheel 61 in either direction.

Figure 17:
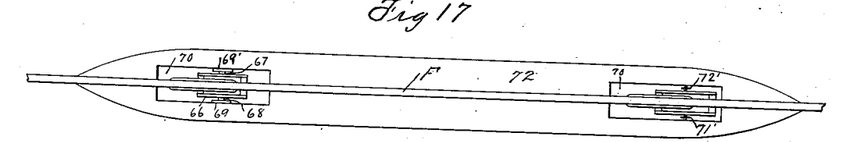
Figure 18:
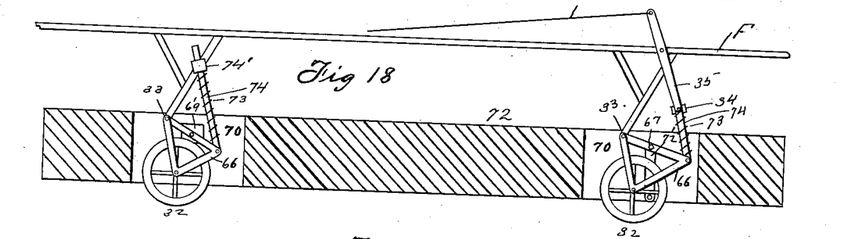

It will be observed that a method of depressing the rear of the machine hereinafter described will be very advantageous in case of marine work when rising from the water, as pontoons may be used in place of wheels, or in combination therewith, the wheels projecting below the boats, so as to make the machine available for both land and water without change. For such use I have shown a method of combining the pontoons with the wheels, see Figs. 17, 18, 19, which show an end, side, and plan view of the parts of the frame of the machine, suitably arranged for such combination, which is as follows: I provide the pontoons 71—72 with central vertical openings 70, extending from top to bottom, and made water tight, of sufficient size to allow for free passage of wheels 32 mounted on hinged frames 66. From each side of the forward frame 66 extend arms 67—68 engaging in sockets 69—69' built in each side of the opening 70, in the bow. To allow for change or variation in distance when either front or rear wheel 32 is depressed independently by reason of its striking the ground or water first, I provide, in rear opening 70 and on each side thereof, levers 71' 72', hinged at their lower ends to inside of said opening, their movable upper ends, engaging and pivoted to arms 67—68 on frame 66. Frames 66 are free to swing, longitudinally in said rear opening 70, and to allow for independent depression of either bow or rear wheel 32, without undue strain, either upon frame of machine, or upon the pontoons. Of course, it is understood that these pontoons are water tight, and that these openings are boarded up from deck to bottom and that the sockets 69—69' and arms 67—68 are so proportioned and located that wheels 32 project below pontoons a sufficient distance to allow landing on said wheels without striking the pontoons on the ground. Thus it will be seen that the machine may land on either land or water, as, when landing on solid foundation, the wheels are pressed upwardly carrying the pontoons up with them, and keeping them from the ground and out of danger of damage or strain from collision with same.

The pontoons are made of wood, or any suitable light material.

Figure 6:
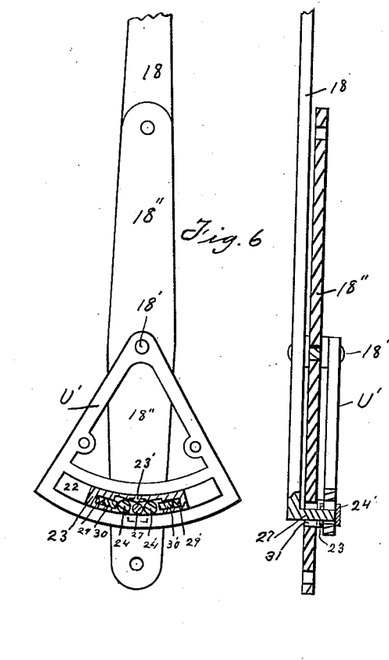
Fig. 6 shows side and end elevation of lever locking device.
Figure 7:
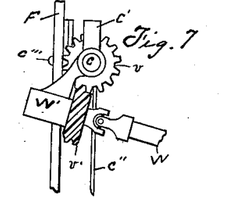
Fig. 7 shows end elevation of propeller sleeve bearings.

In alighting, and at other times, it may be desirable to arrest, or check the forward movement of the machine more quickly than it would normally come to rest by merely stopping the propellers. To more quickly and certainly effect such stoppage, I have provided vertical check planes 8 and 9, normally held out of action, in planes longitudinal with the forward movement of the machine, see Fig. 2, planes 8 and 9, being mounted on vertical pivot shafts 8' and 9', and adapted to be swung crosswise of the machine and present a large retarding surface. These planes are swung into action by movement of lever 10 through connecting wires 10' and 10². On release of lever 10, the planes 8 and 9 resume their normal positions, by reason of the preponderance of air pressure on their rear portions, although they might be positively returned by spring, or otherwise. Connecting wires 10' and 10², engage levers 11 and 11', which are rigidly fastened to vertical pivot shafts 8' and 9', and are led forward to two levers 19, and 9', loosely mounted on shaft 56', also provided with a third lever 20, which connects through wire 20' with lever 10. Lever 10 is provided with the lever-locking device shown in Fig. 6.

Of course it would be possible to arrange a check plane in other positions, and operate it by other means than described; for instance, planes 8 and 9 might be rolled on a roller like a window shade, and placed crosswise of line of movement of machine, and unrolled to present check surface. It will be understood that these check planes may be wholly, or partially operated or swung crosswise, within the limit of movement of lever 10, as may be desired or necessary.

For steering the machine to either side, I employ vertical rudder planes 12, pivoted, on a vertical shaft 13 provided with double end lever 25, to the rear of frame F. These planes are moved by arms 13' and 13'' on steering post 14 provided with hand wheel 14', through connections 15 and 15', and are spaced apart and stayed together, so as to move synchronously as one. Pulleys R have no function other than to change the direction of connecting wires 15—15' to bring them past the motor without interfering with same.

To steer the machine to the right, movement is given so that the rear of the hand wheel revolves to the right. Movement to the left produces the opposite effect. To govern the rise and fall of the machine, I employ horizontal double rudder planes 16, pivotally mounted on horizontal transverse shaft 16' held in a frame work extending in front of the machine. These planes are spaced apart and held by trusses or stays T. For turning or changing their angle, I provide a band wheel 16'' rigidly fastened to shaft 16' over and to which passes and is fastened bands or wires 17 and 17'', connecting with actuating lever 18'' on opposite sides of its axis 18', so that movement either way of lever 18'' will cause a movement of the planes 16 about their axis 16'; wire 17 is fastened to wheel rim 16'' at the forward part on which the wire is always in contact, as at 16'''. In Fig. 1, lever 18, being mounted on the same axial line as lever 37, is not seen, as it is behind same, but their relation is shown by Fig. 2.

To positively hold lever 18'' in any position within range of its movement, I employ the following instrumentalities: Concentric with the axis 18' I provide a frame U' having slideway or groove 22, from the ends of which extend upwardly, portions uniting to form bearing for shaft 18′, and provided with bolt holes for fastening to frame F of machine, see Fig. 6. Twin levers 18 and 18″ are mounted on pivot 18′; the lower end of one of which 18″ is provided on its side, with a shoe 23 which extends into, and slides in groove 22, and has a double incline, or raised part 23′ on which operate two flanged rollers 24 and 24′, normally held toward each other and into locking engagement with the lower sides of slideway 22, and incline 23′. These rollers are normally held toward each other by plungers 30—30′, which are pressed toward rollers 24 and 24′, by spiral springs 29 and 29′, said plungers and springs operating in recesses formed in opposite ends of shoe 23. To release these rollers, so as to allow movement of shoe 23 on the secondary section of lever 18″, connecting with wires 17—17′, I form the primary member, lever 18, with a trip point 27 passing through an opening 31 in the lower end of secondary lever 18″, into slideway 22, and between rollers 24 and 24′. To guide the machine upwardly, by giving planes 16 an upward inclination, the handle or upper portion of lever 18 is pulled toward the rear, point 27 forcing roller 24 down the incline of shoe 23, which moves the plunger 30 and compresses the plunger spring 29, thereby unlocking shoe 23, which is moved toward the front of the machine, by reason of point 27 engaging the wall of the aperture 31 in lever 18″, of which shoe 23 is an integral part. The roller 24′, in the opposite end of shoe 23, is automatically unlocked by reason of the increased space into which it is moved, by the releasing movement of its inclined seat in shoe 23. By this movement of the parts, the upper arm of lever 18″ causes a pull on connection 17, which gives an upward inclination of planes 16, which tends to raise the bow of machine. On cessation of movement by lever 18 the plunger springs 29 and 29′ instantly force plungers 30 and 30′, against rollers 24 and 24′, causing them to lock between incline 23′ and lower wall of slideway 22, and hold lever 18″ immovable, until further movement of point 27 on lever 18. To guide the machine in the opposite direction, an opposite movement of lever 18 is required, and an opposite action of the relative parts takes place.

The leverlocking device may be used in connection with any plane or mechanism that requires to be moved by increments in either direction and automatically locked, as, for instance, the planes in a dirigible balloon. The leverlocking device may also be placed with its frame U′ crosswise of machine, and operated by a hand wheel in place of lever 18.

To facilitate starting the machine from the ground, I drop the rear of the frame, thereby giving the supporting planes a greater lifting angle. Raising the front would produce the same result, but would require a greater outlay of force, so I prefer to shorten the distance between the rear supporting surface or member and frame, momentarily while starting, afterward returning same to their original normal positions. The instrumentalities for doing this are as follows: The rear supporting wheels 32, are mounted in a movable fork or frame 66, hinged at 33, and a link from said frame extends upward and forms part of a toggle joint 34. To the upper toggle lever 35, is connected a wire 36 leading to lever 37. When the machine has cleared sufficiently from the ground, the lever 37 is released, and the toggle joint resumes its normal position, by reason of the weight of said frames and wheels. The wheels on each side are connected so as to move simultaneously, through their connections, with lever 37. To prevent straining the frame unduly on landing, I provide spiral springs 73, to cushion the upward movement of frame 66, inclosing a guide rod 74 pivoted to frame 66 at its lower end, and sliding in a passage in block 74′, pivoted to the wheel frame and above the wheels as shown in Fig. 12. In the rear landing member the spring 73 incloses guide rod 74, which is shorter than member 74 in the forward landing member, and is best shown in Fig. 19; and slides in an aperture in pivot 34. Said spring abuts against lower side of pivot 34 and operates with a shorter compression range than the buffer spring in the forward frame, and in a similar manner. In some cases one rear wheel only may be movable, or provided with the toggle joint for depressing the rear, and used in the center of the frame. It is optional whether the toggle joint is moved past its center line so as to lock, or be moved so as to nearly lock and so held in any suitable way. The same joint may also be moved positively both ways.

The pontoons may be made with an upwardly rounded bow and stern, to clear the ground more surely, instead of the straight bottom shown in the drawings; and sleds or runners may be used in place of wheels as shown, or any suitable ground landing device may be used.

The pontoons are omitted in Figs. 1 and 2, but are shown in Fig. 3. Also the gyroscope wheel is shown in larger diameter in Figs. 1 and 2, and in smaller size in Fig. 3, so as to swing between the pontoons and clear same. The rock shaft 56′ is also shown broken off in Fig. 3 for clearness in illustration.

To ease the strain on brace or guy wires, in alighting and at other times when strained unusually, I prevent breaking same, by mounting them on a flexible seat 78, which I affix to the frame of machine. I provide the guy 76 with an enlargement or head 77' at its end, and under such enlargement, I interpose a yielding cushion, spring, or washer 77. This yielding cushion may be of circular form, or it may be formed with a slot or cut in its side, to allow of slipping sidewise into place over the guy, as may also the seat 78, to allow of slipping the guy in sidewise, instead of through a hole in same. It is immaterial which way it is made, although positive retaining means must be used to keep guy in slot, if so made. The guy may be threaded at its end, and provided with a nut, or it may be bent at a right angle, or have its head upset thereon. The seat is attached to the frame in any suitable manner, and is made with a hole or slot, as may be desired, with a seat for the head and washer as shown in Fig. 15. These yielding guys may be modified, by fastening each end rigidly and providing a sidewise yielding fastening between the ends of 76, to support any parts of machine needing such support, without departing from my invention; or the seat may be yieldingly held to frame and the spring washer dispensed with. One end of guy may be threaded and provided with a nut, to act as a turnbuckle to tighten the guy, and a head upset on the opposite end.

It will be understood that the automatic balancing device could be readily arranged to balance the machine longitudinally as well as laterally, but I prefer to manually balance the machine longitudinally, as the longer dimension of the machine being disposed in that direction, renders it less needful. It can be done without departing from my invention, as all that would be necessary to longitudinally balance the plane would be to provide a transverse pivot to frame O and connect same to planes 16 by connection 17—17', one above and one below the universal joint of gyroscope shaft. This would allow frame O motion longitudinally and laterally. Of course, to cause frame O to make such lengthwise movement, slot O' would be unnecessary, and a frame without said slot, and only a snug passage for shaft S would be required, provided with a downward extension to actuate wire 17', which might connect with a loosely mounted collar on sleeve S'.

I do not claim as my invention the front and rear rudders, as I am aware they have been used before, nor the method of turning same. In place of the pulley on front horizontal rudder shaft, arms may be used, or it may be turned by gears. Neither do I claim broadly the gyroscope as a balancing means, but as an auxiliary for turning the balancing planes.

To operate or fly my machine, I proceed as follows:—The motor being started, I first drop the rear of the frame, by a forward movement of lever 37 which releases toggle joint 34, allowing the rear to drop as governed by said toggle joint; the front rudder planes 16 are set horizontally by lever 18, the propeller inclining lever $a$, is turned to its elevating position, as shown in Fig. 12; pressure is made on foot lever I', and gradually the frictional members X—X', are let into contact, whereby the propellers are started in rotation. When they have gained their normal speed, forward motion will have been imparted to the machine, which will now move forward on its wheels, if on land, or its pontoons if on water. When it is judged sufficient headway has been acquired to rise, planes 16 are given an upward inclination to cause the machine to rise completely from its supporting element; then the gyroscope may be started, by release of foot treadle K''', which releases the gyroscope brake. Lever L'' is next released which sets the friction clutch H—H² into action, thereby putting the gyroscope in rotation for automatically balancing the machine. Foot lever K''', also levers I' and L'', are provided with the well known retaining catches for keeping them in their forward positions, when the friction clutches are disconnected. Steering to either side is accomplished by means of the rear rudder planes 12, through hand wheel 14'. Altitude is governed by lever 18. When the machine is sufficiently clear of the ground, 37 is returned to its former position, allowing frames 66 and wheels 32 to resume the proper position for landing. In landing, the gyroscope is disconnected, and its brake applied, stopping its rotation; the propellers disconnected, and the check planes 8—9, are used as may be necessary by manipulation of lever 10.

What I claim as new, and desire to secure by Letters Patent is—

1. In an aeroplane, the combination with a frame having fixed supporting surfaces and a balancing plane transversely pivoted at each side, of means for inclining said planes during the lateral displacements thereof by transmitting to said planes the momentum of a moving frame, comprising a gyroscope having a vertical shaft mounted on a spherical or universally oscillable bearing, means coöperating with said shaft by which the inertia of the gyroscope coöperating with the laterally tipping frame, through suitable connections, operates to incline said planes; said connections comprising a pivoted and slotted member engaging said shaft and moved thereby during lateral oscillations thereof only, tension connections between said member and the balancing planes, and means to rotate the gyroscope.

2. In an aeroplane, a motor, a frame, horizontal balancing planes pivoted transversely on each side, a gyroscope wheel, a vertical shaft therefor having a bearing allowing rotary and oscillatory movement thereof, horizontally pivoted rock levers mounted on opposite sides of the machine with axes transverse to the balancing plane axes and having four arms or connection-actuating points disposed in quadrants of a circle about their axes, one arm disposed above said horizontal axis, one arm disposed below same, one arm extending horizontally inward toward center of machine, one arm extending outward from center of machine, connections between each of said upper arms and the gyroscope, connections between each of said inner arms and the rear side of the balancing planes, connections between said outer arms and front side of the balancing planes, connections between the lower arms on opposite sides of machine, and means for giving the gyroscope a plurality of revolutions to one of motor.

3. In an aeroplane, the combination with a frame having fixed supporting surfaces and transversely pivoted balancing planes arranged to be inclined by the lateral tipping momentum of the frame transmitted thereto, of a gyroscope mounted on said frame and having a vertical shaft, a spherical bearing therefor, means to rotate the gyroscope, a longitudinally-pivoted and slotted member moved by said shaft, and tension connections between said pivoted member and the balancing planes.

4. In an aeroplane, the combination with a frame having fixed supporting surfaces and lateral balancing planes pivoted transversely at each side thereof and adapted and arranged to be moved by the lateral tipping momentum of the frame transmitted thereto by suitable connections, of a gyroscope mounted on a vertical shaft having a spherical bearing and coöperating to move the balancing planes, a longitudinally-slotted and pivoted member coöperating with the gyroscope shaft, tension connections between the slotted member and the balancing planes, means to rotate the gyroscope, and a positioning brake therefor.

5. In an aeroplane, the combination with a frame having fixed supporting surfaces and a balancing plane transversely pivoted at each side, of a gyroscope mounted on a vertical shaft having a spherical bearing near its upper end and causing said shaft to operate as a lever during the lateral tipping movements of the frame, tension connections between the planes and the gyroscope shaft including a longitudinally slotted and pivoted member engaging said shaft and inoperative during the longitudinal oscillations thereof, and means to rotate the gyroscope.

6. In an aeroplane, a frame having fixed supporting surfaces, balancing planes located one on each side of same, a gyroscope wheel mounted on a vertical shaft having a spherical bearing-member fixed to and concentric with said shaft, a supporting body inclosing said shaft bearing and separable on a line transverse to the axis of said shaft, an annular gear revolubly mounted in said body and concentric with said shaft, connections between said shaft and annular gear for rotating same, connections between the balancing planes and gyroscope, and a motor operatively connected thereto.

7. In an aeroplane, a frame, balancing planes located on each side thereof, a gyroscope coöperating to move said planes simultaneously in opposite directions, tension connections between same and gyroscope, and a manually actuated member coöperating to frictionally engage the gyroscope rim and initially position the same normally with the frame.

8. In an aerial vessel, supporting means, steering and propelling mechanism, balancing planes mounted on each side thereof, a gyroscope having a shaft mounted on a universal bearing, a disconnecting clutch therefor, mechanism for initially positioning said gyroscope and tension connections between said planes and gyroscope, and means for actuating the positioning member.

9. In an aeroplane, a frame having fixed supporting surfaces, transversely-pivoted balancing planes located one on each side of said frame, a gyroscope wheel having a vertical shaft revolubly mounted on a spherical bearing, a pivoted frame inclosing said shaft and slotted to allow free longitudinal oscillation thereof, and tension connections between said slotted frame and the balancing planes.

10. In an aeroplane, the combination with a frame having fixed supporting surfaces, balancing planes pivoted transversely thereto one at each side, of a gyroscope mounted on the frame and having a vertical shaft, a spherical bearing for same, a longitudinally-pivoted and slotted member engaging said shaft and allowing free oscillation of the shaft in said slot without moving the same, connections between said slotted member and the balancing planes, and means to rotate the gyroscope.

11. Combination in an aeroplane, of a frame, a plurality of concavo-convex supporting surfaces located side by side, horizontal transverse balancing planes, and means for actuating same comprising a gyroscope mounted on a vertical shaft, and a motor therefor.

12. In an aeroplane, the combination with a frame having lateral wing frame located at each side at the front, fixed supporting surfaces thereon, a vertical rudder for governing horizontal movements, vertical steering means, of duplex, balanced, opposed and oppositely-movable pivoted brake-planes, and means for simultaneously and equally swinging said planes about their pivots, said actuating means comprising an automatically-locked friction device.

13. In an aeroplane, movable balancing planes located on each side of the machine, a gyroscope wheel, a vertical shaft therefor having a bearing allowing both rotary and oscillatory movements thereof, a brake or clamp for holding the gyroscope wheel stationary at times, connections between the gyroscope shaft and balancing planes, and means for rotating gyroscope.

14. In an aeroplane, a lever locking device comprising a sector plate, having a stud mounted perpendicularly thereon, a slideway or slot in said plate concentric with said stud, a double-arm lever pivoted on said stud one arm having a shoe or projection adapted to slide in said slot, oppositely working spring-pressed locking rollers coöperating to lock said shoe in slideway, a second lever pivoted on said stud, and means for unlocking the rollers and moving the double-arm lever.

15. In an aeroplane, the combination with a main frame having fixed supporting surfaces, a balancing plane transversely pivoted at each side thereof, connections between the planes including rocklevers for giving simultaneous opposite inclinations to said planes, tension connections operating to give to said planes their positive or lifting inclinations, of means for transmitting to said positive connections the force or momentum of said main frame during its lateral tipping movements comprising a vertical direct-acting laterally-inclinable lever or rotary shaft, a spherical bearing located near the upper end of said shaft, a gyroscope wheel mounted on the lower end of said shaft, and means to rotate the gyroscope; said positive connections being connected with said shaft through a longitudinally-slotted and pivoted member engaging the same.

16. Combination in an aeroplane, of a frame, a motor, steering and propelling mechanism, an aerial brake, transversely pivoted balancing planes, a gyroscope for actuating same, tension connection between gyroscope and balancing planes, a gyroscope positioning brake, and means for giving the gyroscope a plurality of revolutions to one of motor.

17. In an aeroplane, a frame, horizontal balancing planes pivoted transversely of frame, a gyroscope mounted on a vertical shaft, a plurality of friction or positioning brake arms therefor disposed so as to engage the periphery of the gyroscope at times, connections for actuating said brake arms, means for moving said connections equally and simultaneously to engage stop and hold the gyroscope stationary, connections between the gyroscope and balancing planes, and a motor therefor.

18. In an aeroplane, the combination with a frame having fixed supporting surfaces and transverse balancing planes pivoted thereto at each side, of a gyroscope mounted on said frame and having a vertical shaft, a spherical bearing therefor, a longitudinally slotted member pivoted to the machine frame and engaging the gyroscope shaft, and tension connections between said slotted member and the balancing planes including rocklevers for changing the direction of the line of motion of said connections.

19. In an aeroplane, a frame, supporting surfaces therefor, horizontal balancing planes pivoted at each side of the center thereof, a gyroscope, a vertical shaft therefor, a spherical bearing on said shaft, a laterally movable member encircling said shaft and slotted in the line of forward motion of the machine and adapted to be moved by the lateral oscillation only of said shaft, tension connections from said slotted member operating to give the said planes a positive inclination, connections between the balancing planes operating to give simultaneously to one a negative inclination when a positive inclination is given to the other and vice versa, and means for rotating the gyroscope.

20. In an aeroplane, balancing mechanism comprising movable planes pivoted on each side of center of the frame, a gyroscope wheel mounted on a vertical revoluble shaft, a bearing allowing oscillation therein of said shaft, an oscillatory member pivoted to and slotted longitudinally of machine, to allow of longitudinal oscillations of said shaft without moving the slotted frame, tension connections between the slotted member and balancing planes, and means to rotate the gyroscope.

21. In an aeroplane, a frame having fixed supporting surfaces, horizontal transversely-pivoted balancing planes located one on each side of said frame, a gyroscope mounted on a vertical shaft having a spherical bearing, said shaft extending through said bearing, causing the upper end of same to oscillate in an opposite direction to that toward which the frame tips, a longitudinally slotted member pivoted to the frame and adapted to be moved by said shaft during lateral oscillations only of the same, tension connections between said member and the balancing planes, and means to rotate the gyroscope.

22. In an aeroplane, a frame having fixed supporting surfaces, a horizontal transverse balancing plane pivoted at each side of the same, means for positively inclining the same utilizing the lateral tipping force or momentum of the frame through the coöperation of a gyroscope mounted on the machine frame and having a vertical shaft mounted on a spherical bearing allowing lateral oscillation thereof, a pivoted and slotted member moved by the shaft and allowing independent vertical steering without interfering with the function of the gyroscope, and tension connections between said member and the balancing planes; the lateral tipping movements of the frame, through the coöperation of the gyroscope, causing a pull upon or a repositioning of said connections to positively incline one of said planes, and, through connections between the planes, a reverse or negative inclination to the opposite plane and vice-versa.

23. In an aeroplane, the combination with a main frame having fixed supporting surfaces, a balancing plane transversely pivoted at each side thereof, tension connections between said planes arranged to give to the one a negative inclination when a positive inclination is given to the other, of means for positively inclining said planes, comprising a directly-connected gyroscope, a vertical shaft therefor having a spherical bearing therefor located near its upper end, a gyroscope wheel mounted on the lower end of said shaft, a longitudinally slotted and pivoted member engaging said shaft, tension connections between said slotted member and the planes, and means to rotate the gyroscope.

24. In an aeroplane, a sector plate provided with a slideway, a pivot stud thereon, a double-arm lever mounted thereon provided with a shoe engaging in said slideway and having a double incline extending each way from the center, flanged rollers engaging said inclined seats, spring pressed members for seating said rollers, and means located between said rollers and movable toward either end of the slide-way for unlocking rollers and moving said double-arm lever.

25. In an organized aerial vessel, a frictionally locked manually-actuated plane moving mechanism, comprising a base plate having therein a slideway or slot having equi-distant or parallel sides, a bi-directionally-movable plane-moving member registering in said slot and having formed thereon a shoe or slide adapted to move in said slot and having oppositely inclined locking-seats sloping downwardly each way from the center thereof, oppositely acting spring-pressed locking members carried by said shoe and registering with said inclined seats, and manually actuated means operating between said locking members to simultaneously unlock same and move the plane-moving member.

26. In an aeroplane, a sector plate provided with a pivot stud, a slideway concentric therewith, a double-arm lever mounted on said stud and provided with a shoe movable in said slideway and having an incline sloping each way from the center thereof, a locking roller operating on each incline, a spring-pressed plunger holding each roller against its respective incline, pressure springs for said plungers, and manually actuated means for unlocking said rollers located between same.

27. In an aeroplane, a sector plate, a stud mounted on one edge of same perpendicular thereto, a circular slideway in said sector plate concentric with said stud, a lever having oppositely disposed arms arranged and adapted to engage with and transmit rectilinear motion to plane-moving connections, a shoe on one of said arms moving in said slideway, spring-pressed plungers located in each end of same, locking-rollers mounted in said slideway, and means for simultaneously unlocking the locking-rollers and moving the double-arm lever.

28. In an organized aeroplane, a frictionally locked bi-directionally movable plane-controlling device comprising a baseplate mounted on the machine frame and having a parallel-sided slideway or slot therein for the reception of the locking devices, a bi-directionally movable plane-controlling member movably mounted and registering with said slot, spring-pressed locking members carried by said plane-moving member and operating in opposite directions in said slot to lock said movable member, and manually actuated means for simultaneously unlocking the locking devices and moving the plane-controlling member.

29. In an organized aeroplane having a frame, supporting surface, steering, balancing, propelling, and landing mechanism, a bi-directionally movable plane-moving member, means for frictionally locking same against said bi-directional movements, and manually actuated means for simultaneously unlocking and moving same in either of said bi-directional movements.

30. In an aeroplane, a lateral balancing mechanism comprising horizontal transversely-pivoted balancing planes located one at each side of the machine, means for positively inclining said planes comprising a directly-acting gyroscope shaft hung on a universal joint or bearing and allowing oscillation thereof and functioning as a vertical automatic oscillable plane-moving lever, connections between the gyroscope and balancing planes comprising tension wires and a laterally-movable longitudinally-slotted member arranged to be moved by the lateral oscillations only of the vertical lever, tension connecting-wires between the planes operating to give to the one a negative inclination when a positive inclination is given to the other by the vertical lever, and vice-versa, and means to rotate the gyroscope.

31. A leverage system for controlling the lateral balance of an aeroplane, by which the momentum or force generated by the lateral tipping movements of the frame is utilized to incline the balancing planes pivoted at each side thereof transversely, through tension connections and rocklevers operating to change the direction of the line of motion of said connections, by combination therewith a gyroscope having a vertical shaft, a spherical bearing therefor allowing lateral oscillation thereof, a longitudinally-slotted member pivoted to the machine frame engaging said shaft and adapted to be laterally swung thereby to move the plane connections and allowing independent vertical steering without interfering with the function of the gyroscope for automatic lateral balancing, and means to rotate the gyroscope.

In testimony whereof, I have signed my name to this specification in the presence of two subscribing witnesses, this twenty-third day of August 1909.

HERBERT E. HAWES.

Witnesses:
W. E. MOUNTFORT,
C. L. LAZELLE.